United States Patent Office 2,971,293
Patented Feb. 14, 1961

2,971,293

METHOD OF STABILIZING SOIL WITH SOLUBLE DRIED BLOOD

Erhard M. Winkler, 2521 Northview Drive, South Bend 16, Ind.

No Drawing. Filed Mar. 24, 1958, Ser. No. 723,607

12 Claims. (Cl. 47—58)

This invention relates to a method of stabilizing soil, and more particularly to a method useful by road builders, landscape architects, and others who desire to stabilize soil in a given contour for a limited period of time until grass seed can germinate and grow to serve the soil stabilizing function.

The primary object of this invention is to provide a novel, simple and inexpensive method which can be practiced with high efficiency and with minimum expenditure of time and materials.

A further object is to provide a method of this character, by means of which soil can be treated to stabilize the same for a limited period of time without detracting from the germination of grass seeds and the growth of grass in the treated soil.

Other objects will be apparent from the following specification.

My method entails the use of a water solution of dried blood by sprinkling thereof upon bare slopes of clay or clay soils which are threatened to be attacked by the action of surface water so as to produce erosion.

I propose to use soluble dried mammal blood which is collected at most meat packing houses, such as the blood of cattle, hogs and sheep. It is now a common practice at most packing houses to dry this blood after the same has been defibrinated. The drying is usually done in air at a temperature above the coagulation point of liquid protein, that is, at a temperature of about 60 degrees centigrade, for use in organic fertilizer, but any soluble type of dried blood may be used. The mammal blood so dried and defibrinated has a color and an odor different from that of fresh blood. Dried mammal blood is commonly in granular character as a result of vaporization of the blood incident to the drying thereof. The granules are such that the particles are capable of passing through a mesh of 100–200 openings per square inch. The granular material is nearly 100% soluble in water and can be shipped in water repellant containers, such as paper bags, and can be stored in those containers for long periods of time if moisture is excluded therefrom.

In preparing the stabilizing material, the powdered dry mammal blood is added to cool or cold water at temperatures in the range between approximately 35 deg. F. and 130 deg. F. Powdered blood is added to the water gradually while the water is being stirred constantly so as to avoid the formation of clumps or solid masses. The degree of concentration may vary through a wide range and it is possible to dissolve as much as one pound nine ounces of dried blood in one gallon of water. Dried blood should be evenly mixed with the water preparatory to use of the method.

The soil is treated by spraying the solution of dried blood and water thereon while the soil is dry. The blood and water mixture or solution is preferably discharged onto the soil by gravity flow from a sprinkling head which is moved progressively along the area to be treated. The sprinkler head may have small discharge apertures providing a plurality of close spaced thin streams of the solution, and preferably will be discharged from a low level. The use of pressure for discharge must be carefully regulated where pressure is exerted, and pressures where they exist must be low enough to avoid the possibility of foaming of the water and blood solution. The solution should not be shaken, vibrated, stirred or otherwise caused to foam as it is discharged. Although the treatment is preferred to be performed while the soil is dry, the water and blood solution may be applied on damp soils although the effectiveness of treatment depends upon the moisture content of the soil and, in cases where the moisture content of the soil at the time of the treatment is such that capillary openings of the soil are substantially filled with water, the effectiveness of the treatment is reduced. Thus the soil must possess some moisture-absorbing properties for satisfactory practice of the method.

The effectiveness of the treatment depends upon the character of the soil. Soils which do not contain any clay will not react with blood nor be treated agqainst soil erosion by practice of this method. Fine sand and silt will be mechanically cemented, but this effect will be of short duration. Soils of the loam type which contain gravel and sand will be stabilized well by treatment of the blood and water solution. The clay content of the soil can be identified easily by handling the same manually in the fingers when wet in a manner to attempt to mold the same. If the soil falls apart during such testing, the clay content may be insufficient for successful use of this process. Another method for determining whether the soil to be treated has sufficient clay content to benefit from the method is to slake a small amount of the soil in question in a glass of water in which the water stands about three inches high in the glass. The slaked soil is then stirred violently to cause the water to become muddy. If the water clears above the soil within the glass within about fifteen minutes after such stirring, the soil may be considered as lacking sufficient clay to benefit from the process. About sixty percent of the soils in the United States contain enough clay to permit the success of the instant method of treatment.

A surface reaction of the blood and water solution on the clay-containing soil causes the soil to change its texture from a muddy surface texture to a more granular surface texture if wet. The soil becomes firmer and more pervious to water as a result of this treatment. This increased firmness of the soil and the granulation thereof causes the soil to resist erosion without substantially changing the water-absorbing properties of the soil or the drainage of the slope of the treated soil.

Although the firmness of the soil is increased, as described above, the fact that the soil is granulated at its surface avoids any adverse effect upon the germination and growth of grass in the treated soil if proper varieties of grass are selected. Fine bladed grass, as the blue grasses, will be retarded in germination and growth unless it is sowed in conjunction with or mixed with grasses of coarser bladed varieties, such as fescue and perennial rye. Grass seed containing a substantial percentage of seed of coarse bladed varieties will germinate and grow well in soil treated by this process.

The effectiveness of the treatment will normally be such that only one treatment thereof will be required to stabilize soil until a sufficient growth of grass occurs to perform its soil-stabilizing function mechanically. However, I have found that in cases where very high relative humidity of air and long continued heavy rains are experienced, that is rains continuing steadily for periods of time from five hours or longer, the stabilizing effect of prior treatment of soil by this method is reduced, and under some circumstances the desired erosion-preventing effect upon the soil may be lost entirely. In such instances it may be necessary to repeat the process by applying a second treatment to the soil after it has dried or at least partially dried.

The amount of water-blood solution which is applied in order to produce the desired results varies in proportion to the slope of the soil and in proportion to the intensity and time duration of rain or other precipitation which is likely to be experienced in the area. I have found that very gentle slopes require applications of the water-blood solution of rather dilute character, so that ten ounces of dried blood in solution will be sufficient to cover one hundred square feet or one pound of the dried blood will be sufficient to cover one hundred and eighty square feet. The use of such dilute solutions is also feasible on steeper slopes in more arid climates which are not subject to long continued heavy rains. The slopes here under consideration are slopes up to ten degrees from the horizontal.

Moderate to steeper slopes, that is, slopes of from ten degrees to 20 degrees from the horizontal in areas subject to semi-humid climates, that is, climates experiencing from twenty to thirty inches of rainfall per year and only occasional driving rains, will be adequately treated by a solution such as to apply from ten ounces to twenty ounces of dried blood per each one hundred square feet, or one pound of dried blood distributed in the solution uniformly over an area of 180 square feet on moderate slopes, to one pound per 90 square feet on the steepest slopes in this category. This rate of application can be increased in more arid climates and reduced in more humid climates.

Steep slopes extending at angles from 20 degrees to 35 degrees or more from the horizontal in areas with average precipitation not exceeding 50 inches of rainfall per year may require blood-water solutions of greater concentration so that from 20 ounces to 36 ounces of dried blood will be applied per each 100 square feet of soil. This rate of application may be reduced or may be effective on even steeper slopes in less humid climates. Long lasting soaking rains on such slopes reduce the effectiveness of the treatment more rapidly than upon gentle or moderate slopes. However, occasional short cloudbursts may not harm the soil or cause excessive erosion even upon steep slopes. The method does not offer much advantage when practiced on slopes steeper than 45 degrees, however.

It is desirable to avoid application of the blood-water solution in high concentration, that is in concentrations of approximately 11 ounces of dried blood per gallon of water or five pounds per eight gallons of water. The viscosity of the solution increases as the blood density in the solution increases, and this increase of viscosity is very noticeable in solutions containing one pound or more of dried blood per one gallon of water. When the solution is applied at the rate of from six to eight gallons per each 100 square feet, as is recommended, a concentration in which blood exceeds 11 ounces per each gallon of water tends to prevent the entrance of the solution into the narrow pores of the soil.

The blood-water solution tends to promote plant growth and supplies the soils abundantly with nitrogen and phosphorus which is readily available to plant life. Thus the practice of the method possesses the advantage of accelerating the growth of grass in the treated soil after it has once germinated and thus accelerates the achievement of mechanical soil stabilization by the grass roots.

One specific example of practice of the method where a gentle previously graded slope on which grass seed containing at least some seed of a coarse bladed grass variety has been sown is to be treated in an area in which only moderate precipitation is expected, is as follows: Ten ounces of soluble dried blood is mixed uniformly in water at a temperature above freezing and not above 130 deg. F. by progressively adding the dried blood to the water while stirring the water until a uniform solution is produced. The solution so prepared is then sprayed or sprinkled substantially uniformly over an area to be stabilized at a rate of approximately six gallons per 100 square feet distributed uniformly. The solution is preferably discharged from a distributor or sprinkler head in liquid and non-foamed state, as by discharge by gravity from a sprinkler head having a plurality of close spaced small apertures through which the liquid is free to flow by gravity as the sprinkler is moved over the area to be covered. Variations in the rate of discharge are made as substantial changes in the slope occur.

Other examples of the practice of the method merely entail selection of a proper concentration for the slope encountered and the weather conditions expected, and fall within the range of concentrations as described above.

There are many variable factors present in different soils and the climate and angularity of slope, but the nature of the soil need not be considered if it contains some clay and the ranges I have indicated above provide a basis of determination of the mixture best suited for any particular locality. Because differences in the effectiveness of the method as practiced on soils containing different types of clay are negligible, the operator need not be concerned with differences in clay content, and, instead, may regulate the concentration of the solution being applied in proportion to variations by the slope of the soil, after having determined the desired range of variations of concentration called for by the climate and expected precipitation in the area. It will be apparent also that the concentration of the application of the dried blood can be regulated according to the slope by changing the speed of travel of the sprinkler or by repeating an application on steep slopes, or by any other means.

While I prefer to use defibrinated dried blood, it is not essential that the fibers be completely removed therefrom, and the method may be practiced by using fiber-containing dried blood.

This method is particularly advantageous over sodding because of the saving of time and expense, and is advantageous over the method of spreading straw on a slope after seeding because of the saving of time and expense and because of its increased effectiveness to prevent surface erosion.

While the preferred embodiments of the invention have been described herein, it will be understood that changes in the method may be made within the scope of the appended claims without departing from the spirit of the invention.

I claim:

1. The method of stabilizing soil, consisting of spreading an aqueous solution of soluble dried mammal blood over the area of soil to be stabilized.

2. The method of stabilizing soil, consisting of spreading an aqueous solution of soluble dried mammal blood over soil in a concentration varying in proportional relationship to slope of the soil from place to place.

3. The method of stabilizing soil, consisting of spreading an aqueous solution of soluble dried mammal blood over soil in a concentration varying proportionally to the slope of the soil and to the expected precipitation.

4. The method of stabilizing soil, consisting of planting grass seed containing at least some seed of a coarse blade grass variety, and spreading an aqueous solution of soluble dried mammal blood over the soil after seeding.

5. The method of stabilizing soil, consisting of spreading by gravity flow an aqueous solution of soluble dried mammal blood substantially uniformly over the area to be stabilized.

6. The method of stabilizing soil, consisting of spreading an aqueous solution of soluble dried mammal blood in non-foamed condition over the area to be stabilized.

7. The method of stabilizing soil, consisting of the steps of planting grass seed containing at least some seed of a coarse blade grass variety, and then spreading an aqueous solution of soluble dried mammal blood in concentrations varying proportionally to the steepness of the slope of the soil and in a range from approximately ten ounces of dried blood per 100 square feet on slopes up to ten degrees from the horizontal to approximately 36 ounces of dried blood per 100 square feet on slopes up to thirty degrees from the horizontal.

8. The method of stabilizing soil, consisting of the steps of planting grass seed containing at least some seed of a coarse blade grass variety, and then spreading an aqueous solution of soluble dried mammal blood in unfoamed condition over the area to be stabilized.

9. The method of stabilizing soil, consisting of the steps of planting grass seed containing at least some seed of a coarse blade grass variety, selecting a range of concentration of application of an aqueous solution of soluble dried mammal blood according to the normal rate of precipitation experienced in the locality, and then spreading said solution over said area in concentration varying in the selected range proportionally to the steepness of the slope of said soil from place to place.

10. The method of stabilizing soil, consisting of the steps of testing the soil to ascertain that it contains at least some clay and is capable of absorbing moisture, planting grass seed, and then spreading an aqueous solution of soluble dried mammal blood at a rate varying proportionally to the steepness of the slope of the soil from place to place and in a manner to avoid foaming of the solution.

11. The method of stabilizing soil containing at least some clay, consisting of testing the soil to determine its moisture absorbency, planting grass seed containing at least some seed of coarse bladed grass, and then spreading an aqueous solution of soluble dried mammal blood at a rate proportional to the slope of the soil and in the order of up to ten ounces of dried blood per 100 square feet on slopes up to ten degrees, from ten ounces to twenty ounces per 100 square feet on slopes to twenty degrees and from twenty ounces to thirty-six ounces of dried blood per 100 square feet on slopes up to thirty-five degrees.

12. The method of stabilizing soil, consisting of the steps of planting grass seed containing at least some seed of a coarse blade grass variety, and then spreading an aqueous solution of soluble dried mammal blood in unfoamed condition over the area to be stabilized, said solution containing less than eleven ounces of dried blood per gallon of water.

References Cited in the file of this patent

UNITED STATES PATENTS 2,625,471    Mowry _____ Jan. 13, 1953

FOREIGN PATENTS 47,094    India _____ July 17, 1952

OTHER REFERENCES

"Gardener's Assistant (Thompson), published by Blackie and Son (London), 1878. Page 47 is relied on.

"Agriculture" (Storer), vol. 1, published by Scribner (N.Y.), 1892. Pages 383, 384, 385 relied on.

Condensed Chemical Dictionary, published 1956 by Reinhold (N.Y.). Page 163 relied on.

Winkler: "The Effect of Blood on Clays," published August 1956, in Soil Science (magazine), vol. 82, No. 2, pages 157 through 164.